(12) United States Patent
Wada et al.

(10) Patent No.: US 10,991,988 B2
(45) Date of Patent: Apr. 27, 2021

(54) BATTERY PACK, AND BATTERY SYSTEM COMPRISING THE SAME

(71) Applicant: OMRON CORPORATION, Kyoto (JP)

(72) Inventors: Junichi Wada, Tokyo (JP); Hiromasa Takatsuka, Tokyo (JP); Kazuki Kasai, Tokyo (JP)

(73) Assignee: OMRON CORPORATION, Kyoto (JP)

( * ) Notice: Subject to any disclaimer, the term of this patent is extended or adjusted under 35 U.S.C. 154(b) by 313 days.

(21) Appl. No.: 15/758,513

(22) PCT Filed: Nov. 2, 2016

(86) PCT No.: PCT/JP2016/082616
§ 371 (c)(1),
(2) Date: Mar. 8, 2018

(87) PCT Pub. No.: WO2017/086167
PCT Pub. Date: May 26, 2017

(65) Prior Publication Data
US 2018/0248229 A1    Aug. 30, 2018

(30) Foreign Application Priority Data
Nov. 17, 2015  (JP) .............................. JP2015-224387

(51) Int. Cl.
*H02J 7/00*     (2006.01)
*H01M 10/42*   (2006.01)
(Continued)

(52) U.S. Cl.
CPC ......... *H01M 10/425* (2013.01); *H01M 10/44* (2013.01); *H01M 10/46* (2013.01);
(Continued)

(58) Field of Classification Search
CPC .... H01M 10/425; H01M 10/46; H01M 10/44; H01M 10/48; H01M 2010/4271;
(Continued)

(56) References Cited

U.S. PATENT DOCUMENTS 6,150,793 A   11/2000  Lesesky et al.
6,154,006 A   11/2000  Hatanaka et al.
(Continued)

FOREIGN PATENT DOCUMENTS

JP   H10-293874 A    11/1998
JP   2002-291110 A   10/2002
(Continued)

OTHER PUBLICATIONS

Supplementary European Search Report dated May 23, 2019 in a counterpart European patent application.
(Continued)

*Primary Examiner* — Zixuan Zhou
(74) *Attorney, Agent, or Firm* — Metrolex IP Law Group, PLLC (57) ABSTRACT

A battery pack (10) is a battery pack that is charged by a charger, and includes an input component (11) to which current and voltage are applied from the charger, and a current and voltage measurement component (12) that measures the current and voltage inputted to the input component (11).

2 Claims, 9 Drawing Sheets

(51) Int. Cl.
| | |
|---|---|
| *H01M 10/44* | (2006.01) |
| *H01M 10/48* | (2006.01) |
| *H02J 7/02* | (2016.01) |
| *H01M 10/46* | (2006.01) |
| *B60L 58/10* | (2019.01) |
| *B62M 7/08* | (2006.01) |

(52) U.S. Cl.
CPC .......... *H01M 10/48* (2013.01); *H02J 7/0021* (2013.01); *H02J 7/02* (2013.01); *B60L 58/10* (2019.02); *B60L 2200/12* (2013.01); *B60L 2240/547* (2013.01); *B60L 2240/549* (2013.01); *B62M 7/08* (2013.01); *H01M 2010/4271* (2013.01); *H01M 2220/20* (2013.01); *Y02T 10/70* (2013.01)

(58) Field of Classification Search
CPC ...... H01M 2220/20; H02J 7/02; H02J 7/0021; Y02T 10/7005; B60L 58/10; B60L 53/60; B60L 2200/12; B60L 2240/547; B60L 2240/549; B62M 7/08
USPC ................................................ 320/109, 112
See application file for complete search history.

(56) References Cited

U.S. PATENT DOCUMENTS

| | | | |
|---|---|---|---|
| 6,429,622 | B1 | 8/2002 | Svensson |
| 8,652,670 | B2 | 2/2014 | Uchida |
| 9,194,919 | B2 | 11/2015 | Uesaka |
| 2007/0194751 | A1 | 8/2007 | Odaohhara |
| 2011/0089900 | A1 | 4/2011 | Hogari |
| 2011/0127956 | A1* | 6/2011 | Mitsutani .............. B60W 10/26 320/109 |
| 2012/0049786 | A1 | 3/2012 | Kuramoto |
| 2012/0101755 | A1 | 4/2012 | Hirasawa |
| 2012/0116699 | A1 | 5/2012 | Haag et al. |
| 2013/0026972 | A1 | 1/2013 | Luke et al. |
| 2013/0026973 | A1 | 1/2013 | Luke et al. |
| 2013/0149578 | A1 | 6/2013 | Uchida |
| 2014/0089692 | A1 | 3/2014 | Hanafusa |
| 2014/0217935 | A1 | 8/2014 | Matsui et al. |
| 2014/0222358 | A1 | 8/2014 | Morita et al. |
| 2014/0244193 | A1 | 8/2014 | Balasingam et al. |
| 2014/0244225 | A1 | 8/2014 | Balasingam et al. |
| 2014/0361748 | A1* | 12/2014 | Charbiwala ............... H02J 7/34 320/134 |
| 2014/0379188 | A1 | 12/2014 | Uesaka |
| 2015/0180383 | A1 | 6/2015 | Matsumoto |
| 2015/0380716 | A1 | 12/2015 | Zama et al. |
| 2017/0117587 | A1 | 4/2017 | Sugeno et al. |
| 2018/0038916 | A1 | 2/2018 | Haag et al. |
| 2018/0205332 | A1 | 7/2018 | Matsumoto |

FOREIGN PATENT DOCUMENTS

| | | | |
|---|---|---|---|
| JP | 2006-92850 | A | 4/2006 |
| JP | 2006-236806 | A | 9/2006 |
| JP | 2007-35479 | A | 2/2007 |
| JP | 2007035479 | A * | 2/2007 |
| JP | 2007-194052 | A | 8/2007 |
| JP | 2009-186235 | A | 8/2009 |
| JP | 2011-86469 | A | 4/2011 |
| JP | 2012-125142 | A | 6/2012 |
| JP | 2012-159357 | A | 8/2012 |
| JP | 2012-222945 | A | 11/2012 |
| JP | 2013-25589 | A | 2/2013 |
| JP | 2013-74640 | A | 4/2013 |
| JP | 2014-30320 | A | 2/2014 |
| JP | 2014-54082 | A | 3/2014 |
| JP | 2014-135895 | A | 7/2014 |
| JP | 2014-149280 | A | 8/2014 |
| JP | 2014-169059 | A | 9/2014 |
| JP | 2014-193081 | A | 10/2014 |
| JP | 2015-204149 | A | 11/2015 |
| WO | 2013016570 | A1 | 1/2013 |
| WO | 2017/086166 | A1 | 5/2017 |
| WO | 2017/086171 | A1 | 5/2017 |

OTHER PUBLICATIONS

Extended European search report dated Jul. 11, 2019 in a related European patent application.
Extended European search report (EESR) dated Nov. 29, 2018 in a related European patent application.
Office Action dated Apr. 14, 2020 in a related Japanese patent application.
English translation of the International Search Report of a related international application PCT/JP2016/082607 dated Dec. 20, 2016.
English translation of the Written Opinion of a related international application PCT/JP2016/082607 dated Dec. 20, 2016.
English translation of the International Search Report of PCT/JP2016/082616 dated Jan. 24, 2017.
English translation of the Written Opinion of PCT/JP2016/082616 dated Jan. 24, 2017.
English translation of the International Search Report of a related international application PCT/JP2016/082674 dated Jan. 17, 2017.
English translation of the Written Opinion of a related international application PCT/JP2016/082674 dated Jan. 17, 2017.
Japanese Office Action dated Jan. 28, 2020 in a related Japanese patent application.
Japanese Office Action dated Aug. 20, 2019 in a related Japanese patent application.
Japanese Office Action dated Oct. 29, 2019 in a related Japanese patent application.
U.S. Office Action dated Jun. 1, 2020 in a related U.S. Appl. No. 15/759,000.

* cited by examiner

BATTERY PACK, AND BATTERY SYSTEM COMPRISING THE SAME

FIELD

The present invention relates to a battery pack that is charged using a charger, and to a battery system comprising this battery pack.

BACKGROUND

In recent years, a system has been constructed in which a battery pack installed in a vehicle such as an electric motorcycle or an electric bicycle is used and then exchanged at a battery station where charged battery packs are available.

When a battery pack is thus rented out, there is the risk that it will be charged by an improper charging method, such as quick charging with a charger other than a specific designated charger. A battery pack that is charged by an improper charging method such as quick charging is subjected to a high load during charging, which deteriorates the battery pack and ends up shortening its service life. Accordingly, there is a problem in that the number of years the battery pack can be used is shortened for the business owner who lends out the battery pack, so it is conceivable that a claim for compensation will be made against the user or the like who charged the battery pack by an improper charging method.

For example, Patent Literature 1 discloses a vehicle function permission system that limits the number of quick charges or the like so that the battery pack will not be charged by an improper charging method such as unintended quick charging.

CITATION LIST

Patent Literature

Patent Literature 1: JP-A 2014-169059
Patent Literature 2: JP-A 2014-30320

SUMMARY

However, the following problems are encountered with the above-mentioned conventional vehicle function permission system.

With the vehicle function permission system disclosed in the above-mentioned publication, there is no specific mention of how an improper charging method such as quick charging is to be detected and restricted.

It is an object of the present invention to provide a battery pack capable of detecting charging by an improper charging method, and a battery system comprising this battery pack.

The battery pack pertaining to the first invention is a battery pack that is charged by a charger, comprising an input component to which current and voltage are applied from the charger, and a current and voltage measurement component for measuring the current and voltage inputted to the input component.

Here, in order to detect charging by an improper charging method, there are provided an input component to which current and voltage are applied from a charger, and a current and voltage measurement component for measuring the current and voltage.

The phrase "improper charging method" as used here means a charging method with which there is a risk that the battery pack will deteriorate due to being subjected to a higher load than with a charging method used by a designated charger, such as quick charging or charging in which the applied voltage is unstable.

Also, whether or not the charging method is improper may be determined by comparing the result of measuring the current and voltage inputted from the charger with the current and voltage applied during charging by a proper charging method with a known designated charger.

This makes it easy to detect whether or not the battery pack has been subjected to a high load by quick charging or another such improper charging method by measuring the current and voltage inputted from the charger.

As a result, it is detected that the battery pack has been subjected to a high load by charging by an improper charging method, and this is conveyed to the business owner who rents out the battery pack, for example, which means that problems such as a shortening of the number of years the battery pack can be used can be kept to a minimum.

The battery pack pertaining to the second invention is the battery pack pertaining to the first invention, further comprising an improper charge detector for comparing a measurement result from the current and voltage measurement component with a measurement result after charging by a designated charger, and determining whether or not the charging is being done by an improper charging method.

Here, whether or not the charging method is appropriate is determined by comparing a measurement result such as the current value and voltage value applied from the charger with a measurement result such as the current value and voltage value after charging with a designated charger.

Here, the determination by the improper charge detector can be carried out by comparing the current value and/or the voltage value applied from the charger to the battery pack, or the frequency obtained by converting the current value or the like, and confirming whether or not it is an error range within a specific threshold.

This makes it possible to easily detect charging by an improper charging method using a quick charger or the like.

The battery pack pertaining to the third invention is the battery pack pertaining to the second invention, wherein the improper charge detector performs waveform analysis or frequency analysis on the basis of the measurement result from the current and voltage measurement component.

Here, the improper charge detector uses waveform analysis of the current value applied from the charger or frequency analysis in which the current value is subjected to Laplace transform to determine whether or not the charging is being done by an improper charging method.

This makes it possible to easily detect charging by an improper charging method using a quick charger or the like, by comparing the current waveform, the waveform of the frequency, etc.

The battery pack pertaining to the fourth invention is the battery pack pertaining to the second or third invention, wherein the improper charge detector detects a quick charge by a charger other than the designated charger.

Here, the improper charge detector detects quick charging using a charger other than the designated charger as an improper charging method.

As a result, it is detected that the battery pack has been subjected to a high load by quick charging, and this is conveyed to the business owner who rents out the battery pack, for example, which means that problems such as a shortening of the number of years the battery pack can be used can be kept to a minimum.

The battery pack pertaining to the fifth invention is the battery pack pertaining to any of the second to fourth inventions, further comprising a communication component for communicating a detection result from the improper charge detector.

Here, the communication component transmits the measurement result by the current and voltage measurement component or the detection result by the improper charge detector to the business owner who rents out the battery pack, a cloud service, or the like, for example.

This makes it possible to identify a user who has degraded the battery pack by charging by an improper charging method, for example, by sending a history of charging by an improper charging method to the business owner, a cloud service, or the like.

As a result, it is possible to issue a warning to a user who has degraded the battery pack, or to predict a shortening of the number of usable years caused by deterioration, thereby making the service life of the battery pack more accurate.

The battery pack pertaining to the sixth invention is the battery pack pertaining to any of the first to fifth inventions, further comprising a storage component for storing a current value and/or a voltage value measured by the current and voltage measurement component, and the measurement result after charging by a designated charger.

Here, the measurement results by the current and voltage measurement component and the measurement results after charging with a specified charger are accumulated and stored inside the battery pack.

This makes it possible to read out the measurement result by the designated charger and easily confirm whether or not there is a history of deterioration of the battery pack due to an improper charging method, when a battery pack that has been charged by an improper charging method is charged by a designated charger, for example.

The battery system pertaining to the seventh invention comprises the battery pack pertaining to any of the first to sixth inventions, and a designated charger that charges the battery pack by the proper charging method.

Here, a battery system is constituted by the above-mentioned battery pack and a designated charger for charging according to an appropriate charging method.

This makes it possible to easily detect whether or not the battery pack has been subjected to a high load by quick charging or another improper charging method in the past, by measuring the current and voltage inputted from the designated charger.

As a result, it is detected that a high load was applied to the battery pack in the past by charging by an improper charging method, and the business owner who rents out the battery pack, etc., is notified of this, which means that problems such as a shortening of the number of years the battery pack can be used can be kept to a minimum.

The battery system pertaining to the eighth invention comprises the battery pack pertaining to the sixth invention and a designated charger. The designated charger has an improper charge detector that receives from the storage component and compares the measurement result from the current and voltage measurement component on the battery pack side and the result measured after charging with a specific designated charger, and determines whether or not the charging is being done by an improper charging method.

Here, an improper charge detector that compares the current and voltage values stored in the storage component on the battery pack side with the current and voltage values after charging with a designated charger, and that determines whether or not the charging method is appropriate, is provided on the charger side.

Here, the determination by the improper charge detector can be carried out by comparing the current value and/or the voltage value applied from the charger to the battery pack, or the frequency obtained by converting the current value or the like, and confirming whether or not it is an error range within a specific threshold.

Consequently, a history of charging by an improper charging method with a quick charger or the like can be easily detected on the designated charger side.

The battery system pertaining to the ninth invention is the battery system pertaining to the eighth invention, wherein the improper charge detector performs waveform analysis or frequency analysis on the basis of the measurement result from the current and voltage measurement component.

Here, the improper charge detector uses waveform analysis of the current value applied from the charger, or frequency analysis in which the current value is subjected to Laplace transform, for example, to determine whether or not the charging method is appropriate.

Consequently, charging by an improper charging method using a quick charger or the like can be easily detected by comparing the current waveform, the waveform of the frequency, or the like on the designated charger side.

The battery system pertaining to the tenth invention is the battery system pertaining to the eighth or ninth invention, further comprising a communication component for communicating a detection result from the improper charge detector.

Here, the communication component transmits the measurement result by the current and voltage measurement component or the detection result by the improper charge detector to the business owner who rents out the battery pack, a cloud service, or the like.

This makes it possible to identify a user who has degraded the battery pack by charging by an improper charging method, for example, by sending a history of charging by an improper charging method to the business owner, a cloud service, or the like.

As a result, it is possible to re-calculate the usable life prediction for a battery pack, or claim compensation from the user, for example.

EFFECTS

With the battery pack of the present invention, charging by an improper charging method can be detected.

DETAILED DESCRIPTION

Embodiment 1

A battery pack 10 according to an embodiment of the present invention will now be described through reference to FIGS. 1 to 5.

Figure 1:
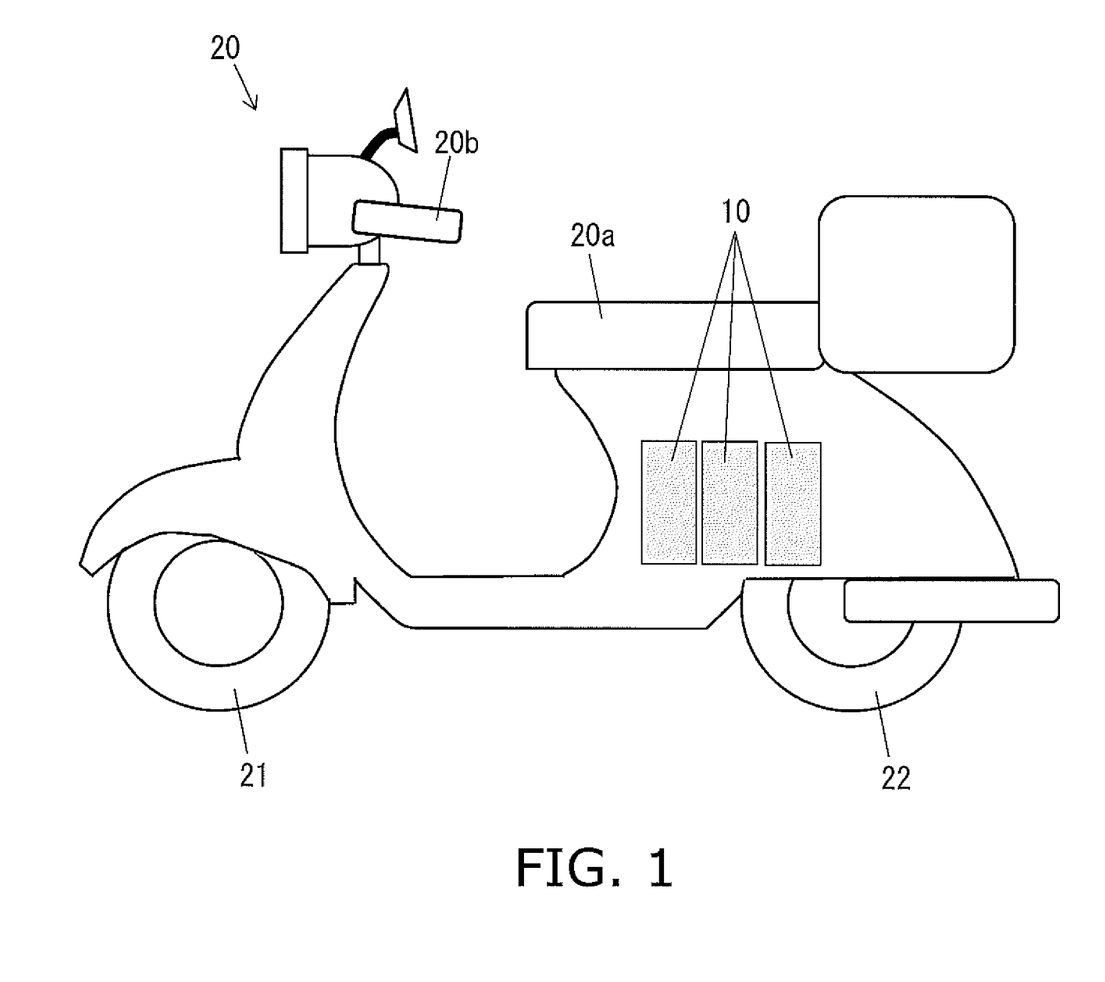
FIG. 1 is a diagram of the configuration of vehicle in which the battery pack according to an embodiment of the present invention has been installed.

As shown in FIG. 1, the battery pack 10 is a secondary battery for supplying power to a vehicle 20, and three battery packs 10 are installed in the vehicle 20 in a state that allows them to be exchanged. The battery packs 10 are then repeatedly used by being charged with a designated charger installed in a specific charging station or the like.

The vehicle 20 is an electric motorcycle that is propelled by being supplied with power from the three battery packs 10 installed under a seat 20a, and is equipped with a front wheel 21 and a rear wheel (drive wheel) 22.

The front wheel 21 is a steered wheel provided between the front part of the vehicle 20 and the road surface, and the travel direction can be varied by changing the orientation in conjunction with the orientation of the handle bar 20b.

The rear wheel 22 is a drive wheel provided between the road surface and the rear part of the vehicle 20 where the battery packs 10 are installed, and is rotationally driven by a motor (not shown).

Configuration of Battery Pack 10

Figure 2:
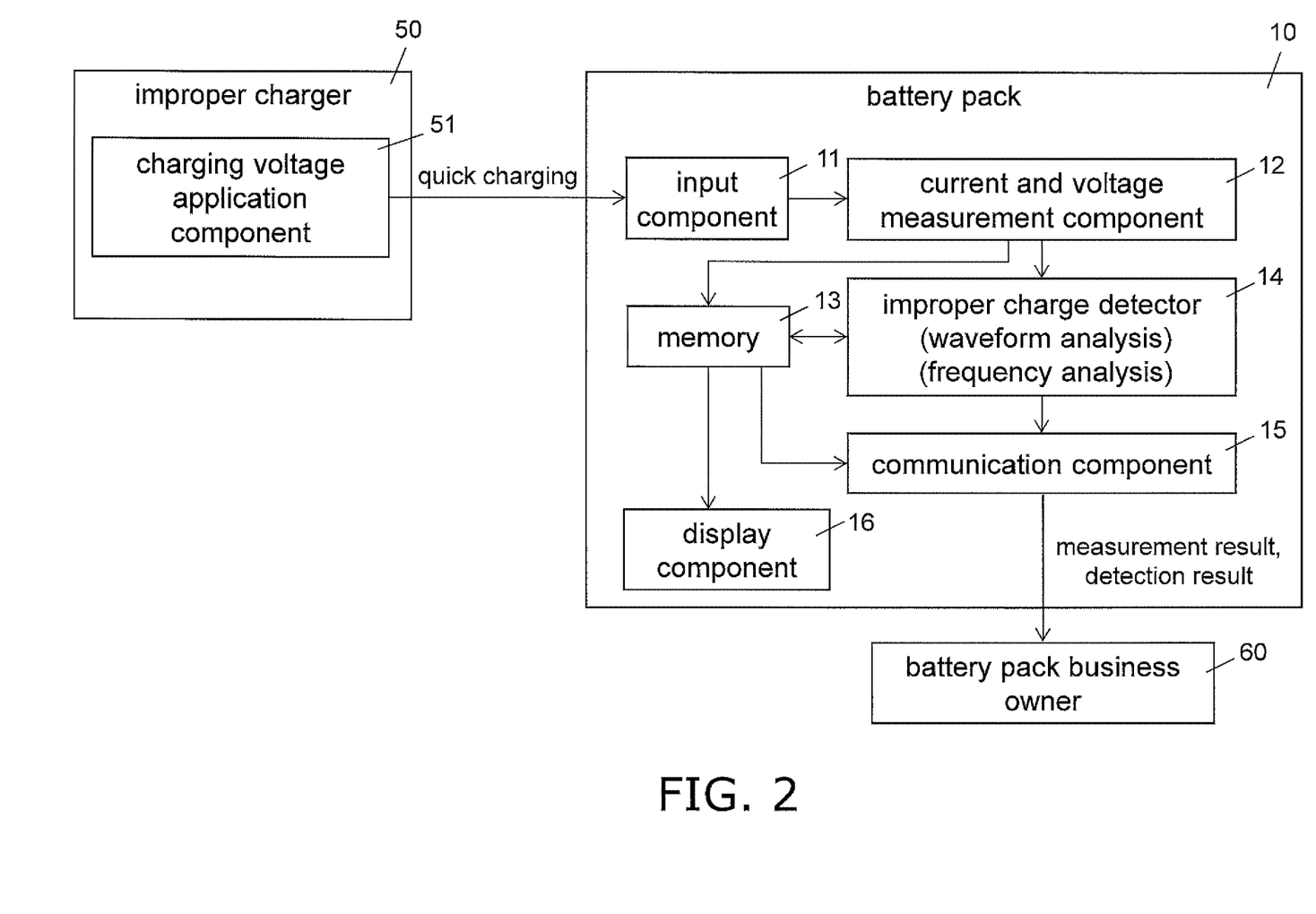
FIG. 2 is a block diagram of the configuration of the battery pack in FIG. 1 and an improper charger.

As shown in FIG. 2, the battery pack 10 in this embodiment includes an input component 11, a current and voltage measurement component 12, a memory (storage component) 13, an improper charge detector 14, a communication component 15, and a display component 16.

FIG. 2 shows a state in which the battery pack 10 connected to an improper charger 50 that performs quick charging is charged by an improper charging method, using a charger installed at a place other than the specified charging station, for example.

The term "improper charging method" as used in this embodiment means a charging method such as so-called quick charging, which tends to degrade the battery pack 10 more than a normal charging method, as is the case with the improper charger 50.

The input component 11 inputs a rapid charging voltage applied from a charging voltage application component 51 of the improper charger 50.

The current and voltage measurement component 12 measures the current and voltage inputted from the improper charger 50 to the input component 11. The current and voltage measurement component 12 then transmits the measurement result to the memory 13 and the improper charge detector 14.

The memory (storage component) 13 stores the measurement result from the current and voltage measurement component 12, and also stores data serving as reference values in determining whether or not the charging is being done by an improper charging method. In this embodiment, data such as the current value (current waveform) and voltage value (voltage waveform) in charging by a specific designated charger, and data such as a distribution diagram of the frequency domain (see FIGS. 3 and 4) are stored in the memory 13 as the data that serve as the above-mentioned reference values.

The waveforms stored in the memory 13 may either current values or voltage values.

The improper charge detector 14 compares the measurement result by the current and voltage measurement component 12 with data such as the current value applied by the designated charger, which is stored in advance in the memory 13, and thereby determines whether or not charging is being done by an improper charging method.

Figure 3:
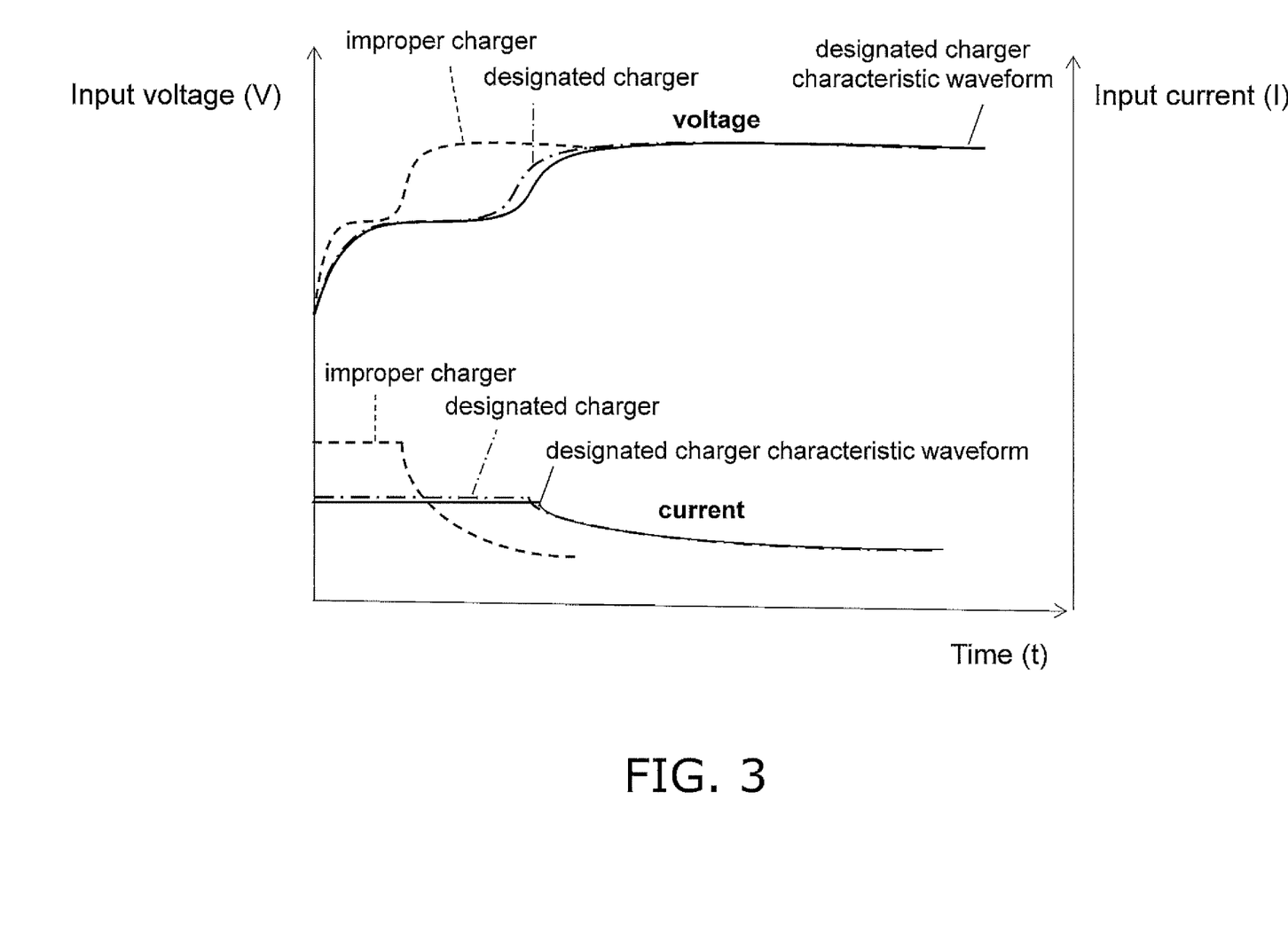
FIG. 3 is a graph comparing the current waveform and voltage waveform during charging of the battery pack in FIG. 1 with an improper charger, the current waveform and voltage waveform during charging with a designated charger, and the characteristic waveforms (current and voltage) of the designated charger.

More specifically, as shown in FIG. 3, the improper charge detector 14 compares the current waveform and voltage waveform based on the measurement result received from the current and voltage measurement component 12, to the characteristic waveforms of the voltage value and current value during charging using the designated charger as retrieved from the memory 13, and makes a determination according to the degree of coincidence between the two.

In the graph shown in FIG. 3, the characteristic waveforms (current value and voltage value) during charging using the specified charger are indicated by solid lines, the waveforms of the current value and voltage value during charging using an improper charger are indicated by broken lines, and the waveforms of the current value and voltage value during actual charging using the specified charger are indicated by one-dot chain lines.

Then, the improper charge detector 14 determines the charging to be appropriate if the error range between the current waveform based on the measurement result received from the current and voltage measurement component 12, and the characteristic waveforms of the current value and voltage value during charging using the designated charger as retrieved from the memory 13, is within a specific threshold value (such as ±5%).

The current waveform and voltage waveform based on the measurement result received from the current and voltage measurement component 12 are subjected to linear or nonlinear waveform processing by least squares method or the like.

On the other hand, if the error range between the two exceeds a specific threshold value (such as ±5%), the charging is determined to be quick charging using the improper charger 50 (charging by an improper charging method).

In this embodiment, as shown in FIG. 3, compared with the characteristic waveform (solid lines) of the designated charger, the error is smaller with the waveforms of the current value and voltage value actually applied by the designated charger (one-dot chain lines). On the other hand, the waveforms (broken line) of the current value and voltage value applied by the improper charger 50 have greater error in the period from the start of charging, etc., as compared to characteristic waveforms (solid line) of the designated charger.

Consequently, since the waveforms (broken line) of the applied current value and voltage value exceed the specified error range, it is determined that charging is being performed by an improper charging method.

Also, the improper charge detector 14 transmits a determination result as to whether or not the charging is by an improper charging method to the memory 13, and also transmits it to the communication component 15.

The determination result transmitted to the memory 13 is stored in the memory 13 in a state of being associated with the measurement result by the current and voltage measurement component 12.

Figure 4:
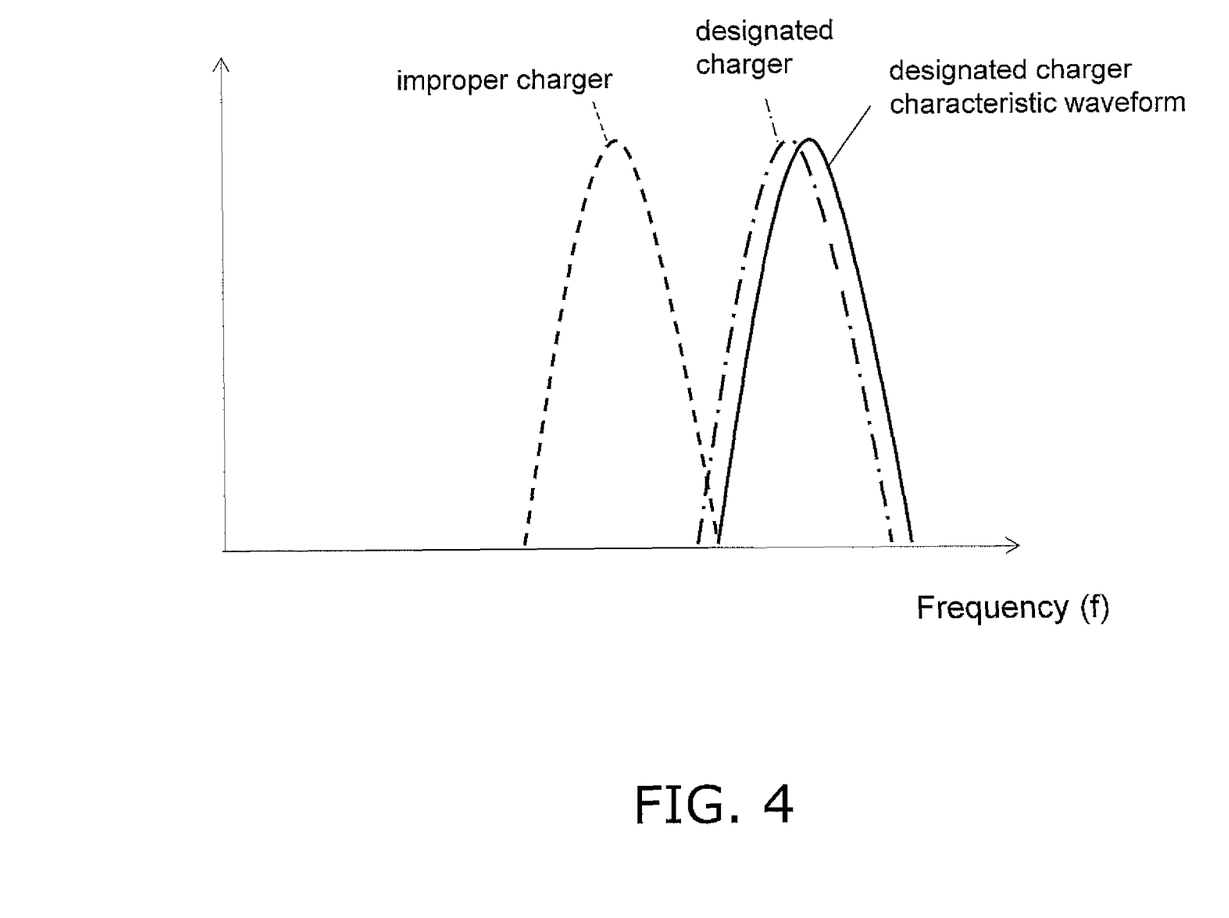
FIG. 4 is a graph comparing the frequency analysis during charging of the battery pack in FIG. 1 with an improper charger, the current waveform during charging with a specified charger, and the characteristic waveforms of the designated charger by frequency analysis.

In addition to a method in which the waveforms of the current value and the voltage value are compared as described above, the determination by the improper charge detector 14 may be performed using the frequency analysis waveform shown in FIG. 4.

More specifically, as shown in FIG. 4, the input waveforms of the current value and voltage value shown in FIG. 3 are transformed into a frequency domain distribution map using Fourier transform or the like, and a determination may be made according to the average value error of the graph in this distribution chart, or the degree of overlap in the distribution.

Here again, as shown in FIG. 4, compared to the characteristic waveforms (solid line) of the designated charger, the error is smaller with the frequency domain distribution diagram of the waveforms of the current value and voltage value actually applied by the designated charger (one-dot chain line). On the other hand, the frequency domain distribution diagram (broken line) of the waveforms of the current value and voltage value applied by the improper charger 50 clearly has a larger error with respect to the characteristic waveforms (solid line) of the designated charger.

Thus, when a determination is made by comparing distribution diagrams of the frequency domain, since the stability is higher than when comparing the input waveforms of the current value and the voltage value, a comparison of the degree of coincidence can be carried out more easily.

The communication component 15 receives the measurement result by the current and voltage measurement component 12 and the detection result by the improper charge detector 14 from the memory 13, and transmits the measurement results to a communication device (not shown) provided the business owner 60 of the battery pack 10.

Consequently, the business owner 60 of the battery pack 10 can recognize that the battery pack 10 may have deteriorated due to an improper charging method such as quick charging. Therefore, depending on the degree of deterioration of the battery pack 10, the business owner 60 can issue a warning to the user of the battery pack 10, or can accurately ascertain the service life of the battery pack by predicting a shortening of the usable period due to deterioration.

The display component 16 is, for example, an indicator or a liquid crystal display panel that displays various kinds of information related to the battery pack 10, and is provided on the front of the battery pack 10. The display component 16 receives from the memory 13 the measurement result for the current value and voltage value applied to the battery pack 10, and receives from the improper charge detector 14 the detection result, and displays these, associated with a number or the like unique to each battery pack 10.

Consequently, a user who has degraded the battery pack 10 through an improper charging method such as quick charging, for example, can be made to recognize that the wrong charging is being performed by looking at a display of the improper charge detection result on the display component 16 of the battery pack 10.

Method for Detecting Improper Charging in Quick Charging Using Improper Charger 50

Figure 5:
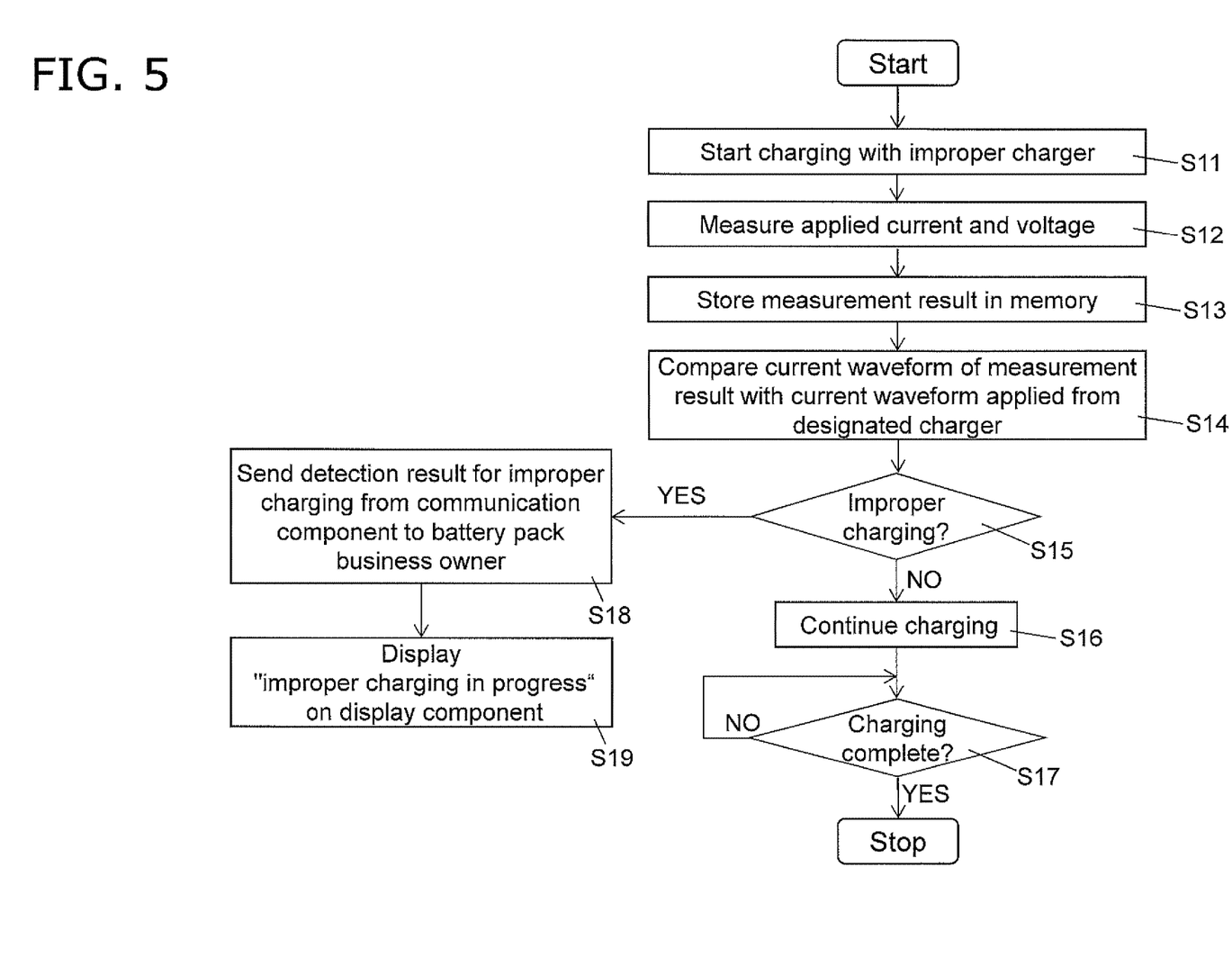
FIG. 5 is a flowchart of a method for detecting improper charging when quick charging from an improper charger is performed on the battery pack of FIG. 1.

With the battery pack 10 in this embodiment, the fact that charging has been performed by an improper charging method, such as quick charging, by the improper charger 50 is detected by the procedure shown in the flowchart of FIG. 5.

That is, in step S11, charging is started from the charging voltage application component 51 on the improper charger 50 side to the input component 11 on the battery pack 10 side.

Next, in step S12, the current and voltage measurement component 12 on the battery pack 10 side measures the current value and voltage value applied from the improper charger 50.

Next, in step S13, the current value and voltage value measured by the current and voltage measurement component 12 are stored in the memory 13.

Next, in step S14, the improper charge detector 14 compares the measurement result by the current and voltage measurement component 12 stored in the memory 13 with the data that serves as a reference value for determination and has been stored in advance in the memory 13.

Here, as discussed above, "data that serves as a reference value" means the waveforms of the current value and voltage value (see the solid lines in FIG. 3) appearing when charging is performed by the designated charger, or a distribution diagram of the frequency domain thereof (see the solid lines in FIG. 4).

Next, in step S15, as a result of the comparison in step S14, it is determined whether or not the charging is improper according to whether or not the measurement result exceeds a specific error range with respect to the data as a reference for determination.

Here, if it is determined that the charging is not improper, that is, that the measurement result is within the specified error range, the flow proceeds to step S16. On the other hand, if it is determined that the charging is improper, that is, that the measurement result exceeds the specified error range, the flow proceeds to step S18.

Next, in step S16, since it was determined in step S15 that the charging is not improper, charging is continued. Then, in step S17, voltage is applied from a charger until the charging is complete.

On the other hand, in step S18, since it was determined in step S15 that the charging is improper, the detection result of improper charging is transmitted via the communication component 15 to the business owner 60 of the battery pack 10 along with the measurement result.

Consequently, the business owner 60 of the battery pack 10 can recognize that a battery pack 10 being rented out has deteriorated due to an improper charging method such as quick charging. Therefore, it is possible to take measures such as warning the user who has shortened the usable life of the battery pack 10 by charging by an improper charging method such as quick charging.

Next, in step S19, the display component 16 of the battery pack 10 displays a warning of "improper charging." This alerts the user of the battery pack 10 that charging is being done by an improper charging method.

The warning display on the display component 16 may be displayed as text information, or the user may be notified by some other means such as turning on or flashing a red warning lamp.

As described above, with the battery pack 10 in this embodiment, the current value and so forth applied from the improper charger 50 to the input component 11 are measured by the current and voltage measurement component 12, so that charging by an improper charging method such as quick charging is detected.

Consequently, it is possible to take measures such as warning the user by alerting to the risk that the battery pack 10 may be degraded by charging by an improper charging method such as quick charging. Furthermore, the business owner or the like of the battery pack 10 can improve management accuracy, such as predicting the service life of the battery pack 10.

Embodiment 2

The battery pack 110 pertaining to another embodiment of the present invention, and a battery system 100 comprising this battery pack, will now be described through reference to FIGS. 6 to 8.

Figure 6:
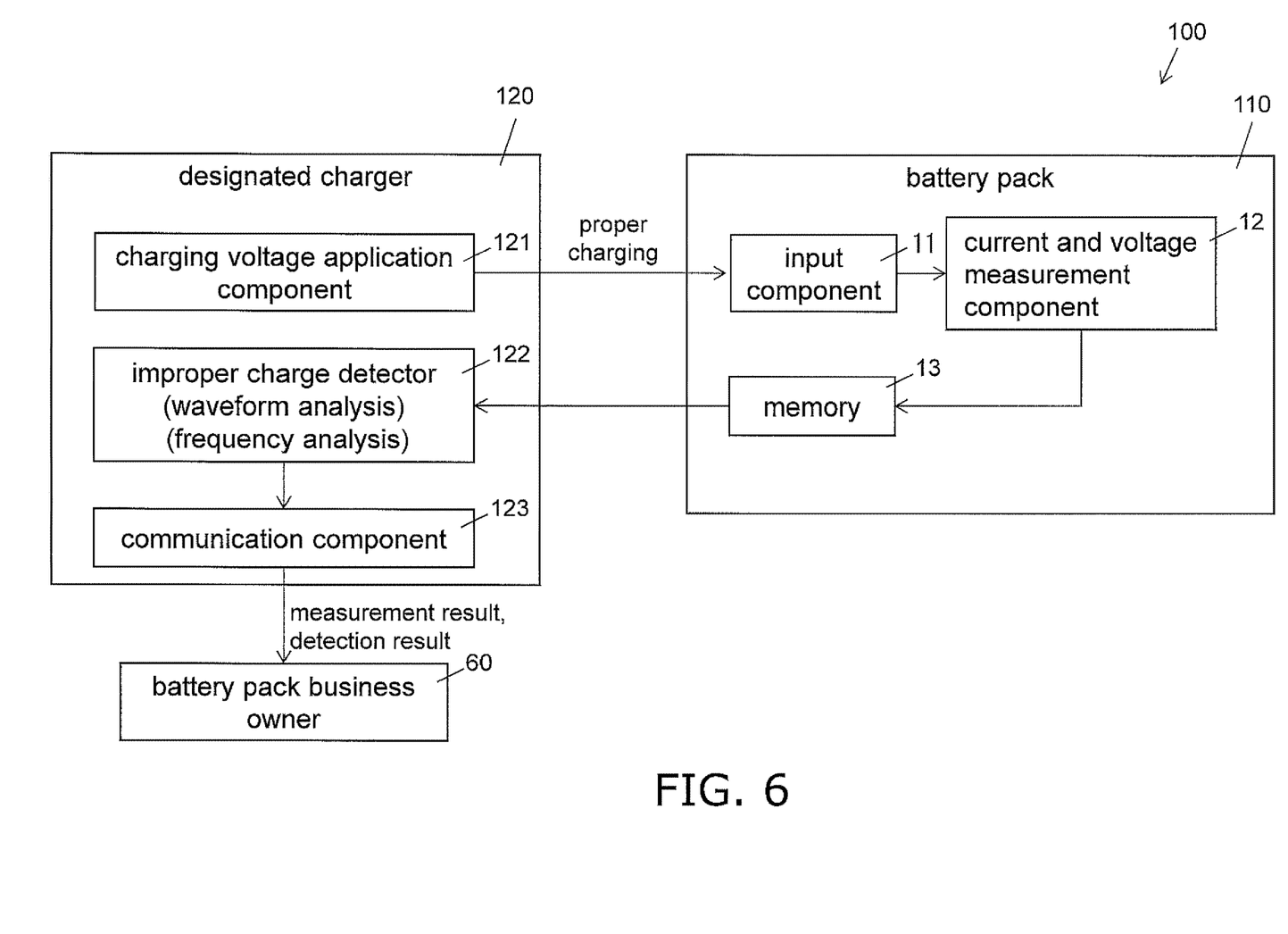
FIG. 6 is a block diagram of the configuration of a battery system including the battery pack according to another embodiment of the present invention and a designated charger.

As shown in FIG. 6, the battery system 100 of this embodiment differs from Embodiment 1 above in that when charging the battery pack 10 with a designated charger 120, it is detected on the designated charger 120 side whether or not the charging by an improper charging method has been performed in the past.

Those components having the same function as in the first embodiment will be numbered the same, and will not be described again in detail.

In the battery system 100 in this embodiment, the battery pack 110 comprises the input component 11, the current and voltage measurement component 12, and the memory 13.

Meanwhile, the designated charger 120 comprises a charging voltage application component 121, an improper charge detector 122, and a communication component 123.

That is, with the battery system 100 in this embodiment, whether or not charging by an improper charging method was performed in the past is determined by the improper charge detector 122 on the designated charger 120 side using the data stored in the memory 13 on the battery pack 10 side, etc.

Figure 7:
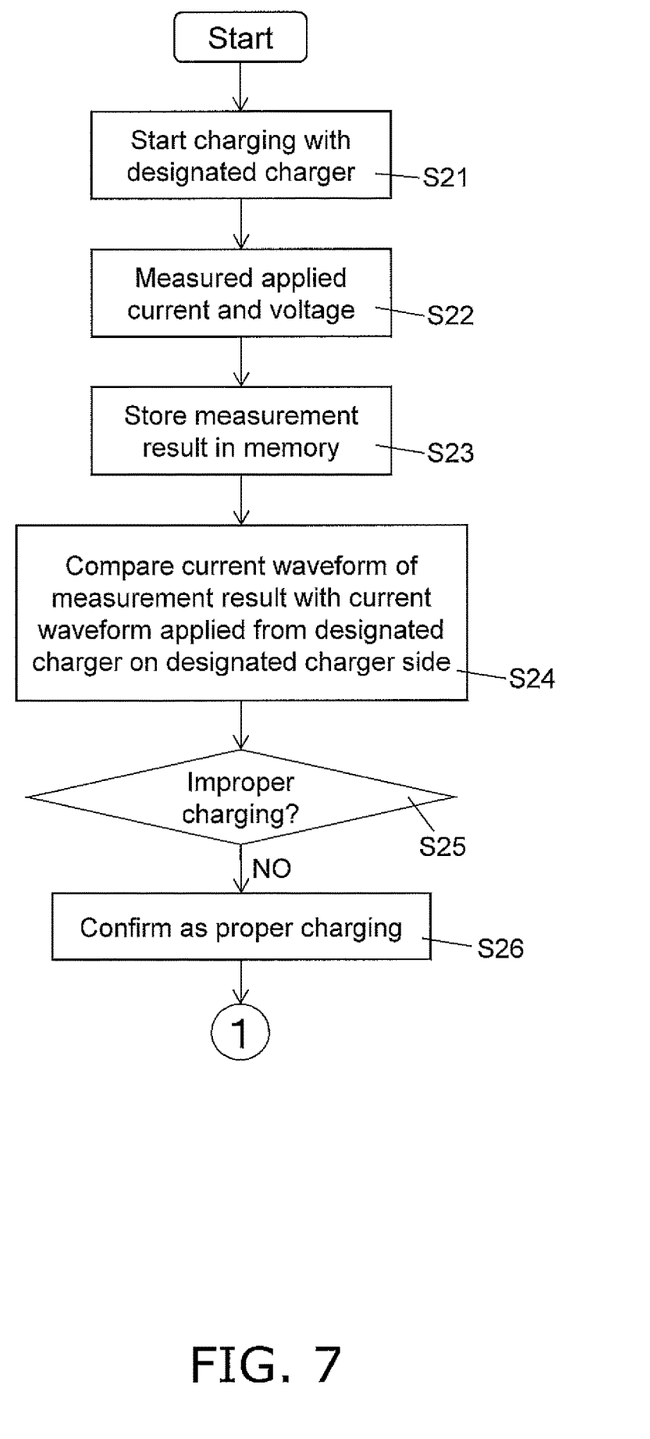
FIG. 7 is a flowchart of a method for detecting that the battery pack included in the battery system in FIG. 6 is being properly charged from the designated charger.

More specifically, first, determination of whether or not the designated charger 120 currently charging is performing proper charging is performed by the procedure shown in the flowchart of FIG. 7.

That is, in step S21, charging is started from the charging voltage application component 121 of the designated charger 120 to the input component 11 of the battery pack 110.

Next, in step S22, the current and voltage measurement component 12 on the battery pack 110 side measures the current value and voltage value applied from the designated charger 120.

Next, in step S23, the current value and voltage value measured by the current and voltage measurement component 12 are stored in the memory 13.

Next, in step S24, the improper charge detector 122 on the designated charger 120 side compares the measurement result by the current and voltage measurement component 12 stored in the memory 13 of the battery pack 110, with the current waveform, etc., stored in advance in the memory 13.

Here, as discussed above, "data that serves as a reference value" means the waveforms of the current value and voltage value (see the solid lines in FIG. 3) appearing when charging is performed by the designated charger 120, or a distribution diagram of the frequency domain thereof (see the solid lines in FIG. 4).

Then, in step S25, it is determined whether or not the charging is improper, according to whether or not the comparison result in step S24 and the measurement result exceed a specific error range for data that serves as a reference in determination.

In this embodiment, because charging is done by the designated charger 120, it is determined that there is no improper charging, that is, that the measurement result is within the specified error range, and the flow proceeds to step S26.

In step S26, as a result of the determination in step S25, it is confirmed that the designated charger 120 is charging by a proper charging method, that is, that there is no charging by an improper charging method such as quick charging.

Figure 8:
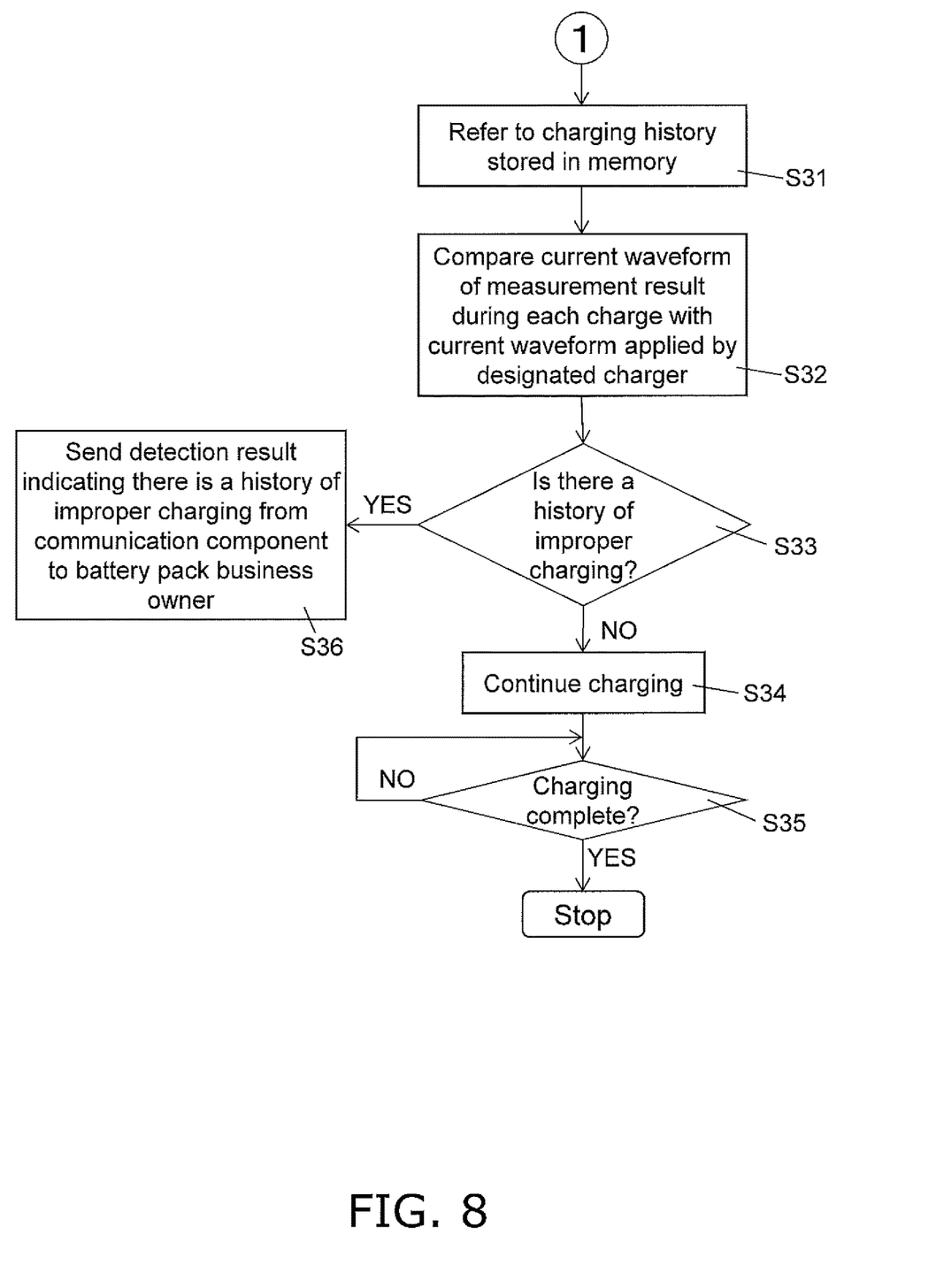
FIG. 8 is a flowchart of a method for detecting an improper charging history following the proper charge detection method in FIG. 7.

Then, past charging record data stored in the memory 13 of the battery pack 110 is retrieved, and a determination of whether or not charging by an improper charging method was performed in the past is made according to the procedure shown in the flowchart in FIG. 8.

That is, in step S31, the improper charge detector 122 on the designated charger 120 side retrieves the charging history stored in the memory 13 on the battery pack 110 side.

Next, in step S32, the improper charge detector 122 compares the measurement results (current waveforms, etc.) for each charging stored in the memory 13, with the current waveforms and the like after charging by the designated charger 120.

Next, in step S33, it is determined whether or not there is a history of charging by an improper method such as quick charging in past charging.

Here, if it is determined that there is no history of charging by an improper charging method in the past, the flow proceeds to step S34. On the other hand, if it is determined that there is a history of charging by an improper charging method in the past, the flow proceeds to step S36.

In step S34, since it was determined in step S33 that there is no history of charging by an improper charging method in the past, charging is continued as it is. Then, in step S35, voltage is applied from the charger until the charging is completed.

On the other hand, in step S36, since it was determined in step S33 that there is a history of charging by an improper charging method in the past, the result of detecting an improper charging history is sent along with the measurement result via the communication component 123 to the business owner 60 of the battery pack 110.

Consequently, just as in Embodiment 1 above, the business owner 60 of the battery pack 110 can recognize that there is a risk that a battery pack 110 that has been rented out has deteriorated due to charging by an improper charging method such as quick charging. Therefore, it is possible to refer to the past usage history information, etc., and take measures such as warning the user that the usable life of the battery pack 110 has been shortened by charging with an improper charging method such as quick charging.

With the battery system 100 in this embodiment, as discussed above, the fact that charging by an improper charging method was performed in the past is stored in the memory 13 of the battery pack 110. Then, when the charging is performed by a proper charging method by the designated charger 120, whether or not there charging by an improper charging method was performed in the past can be detected by the designated charger 120 by referring to the history stored in the memory 13 or the like.

Consequently, it is detected that there is a risk that the battery pack 110 has deteriorated due to charging by an improper charging method such as quick charging performed in the past, so measures can be taken such as referring to the usage history, etc., and warning the user. Also, the business owner of the battery pack 110, etc., can improve the management accuracy of service life prediction and so forth for a degraded battery pack 110.

Other Embodiments

Embodiments of the present invention were described above, but the present invention is not limited to or by the above embodiments, and various modifications are possible without departing from the gist of the invention.

(A)

In Embodiment 1 above, an example was given in which the improper charging method was quick charging performed using the improper charger 50. However, the present invention is not limited to this.

For example, besides quick charging, improper charging methods include any charging method that accelerates deterioration of the battery pack, such as charging using an unstable charger with which the voltage applied to the battery pack abruptly rises and falls, or charging that exceeds the upper limit of a full charge of the battery pack.

In either of the above cases, charging by an improper charging method can be detected just as in the above embodiment by performing analysis of the current waveform or a voltage waveform applied to the battery pack, frequency analysis, or the like.

(B)

In Embodiment 2 above, an example was given of a battery system 100 in which the past charging history stored in the memory 13 on the battery pack 110 side was retrieved, and the improper charge detector 122 on the designated charger 120 side detected charging by an improper charging method. However, the present invention is not limited to this.

For example, just as in Embodiment 1, the configuration may be such that an improper charging detector is provided on the battery pack side, and the determination result by the improper charging detector is stored in a memory.

Here again, the battery system can be constructed so that the same effect as in Embodiment 2 can be obtained by taking out the determination result by the improper charge detector that is stored in the memory when the battery pack is connected to a designated charger.

(C)

In Embodiment 1 above, an example was given of providing the memory 13 in the battery pack 10. However, the present invention is not limited to this.

Figure 9:
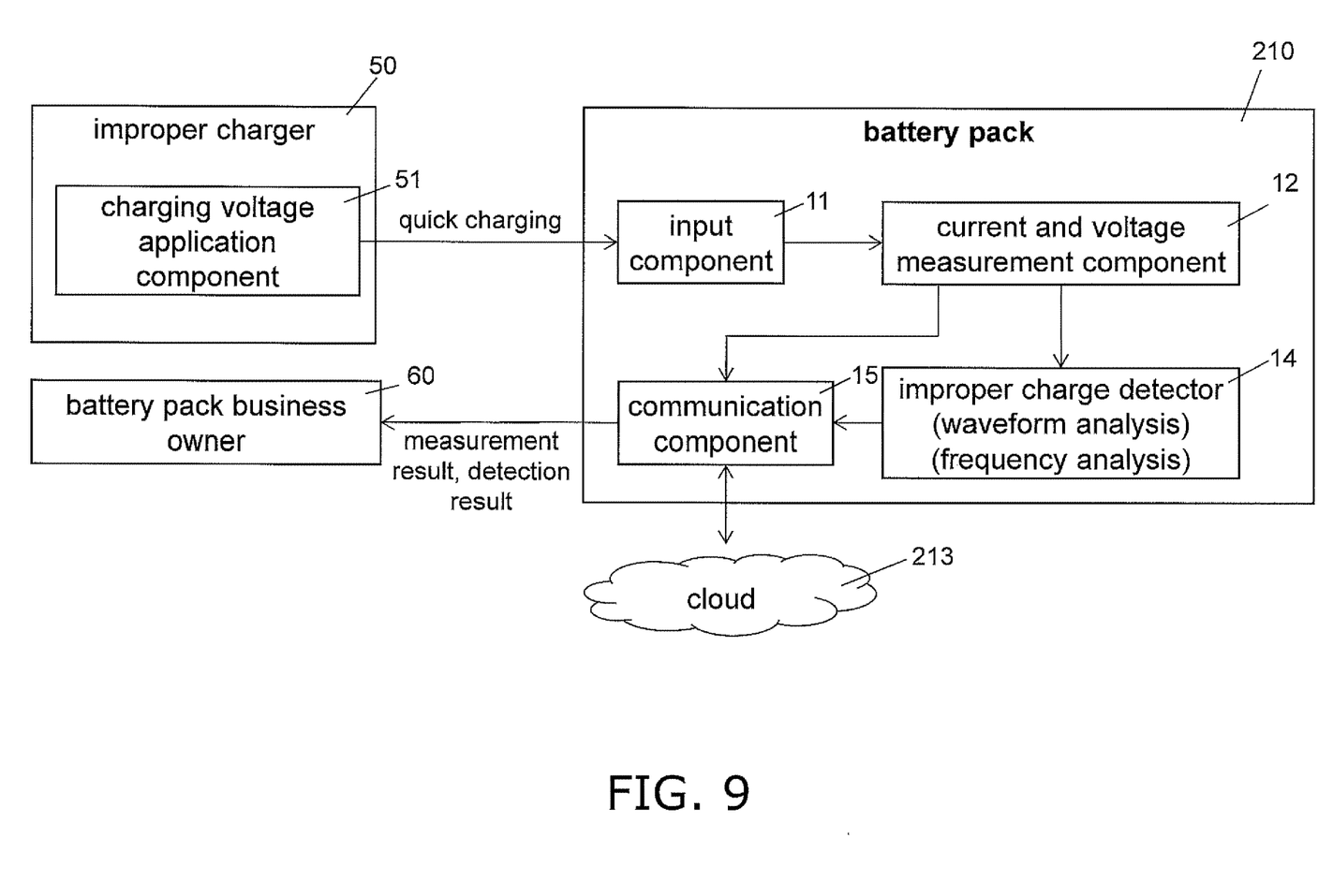
FIG. 9 is a block diagram of the configuration of a battery pack according to yet another embodiment of the present invention.

For example, as shown in FIG. 9, a cloud 213 that can communicate with a battery pack 210 via the communication section 15 may be used in place of a memory.

Here again, various kinds of information can be sent via the communication component 15 to the cloud 213, allowing the measurement results by the current and voltage measurement component 12, the detection results by the improper charge detector 14, and so forth to be stored in a specific region in the cloud 213.

Thus, as needed, the necessary information can be retrieved from the cloud 213, and a warning or the like can be issued to the user who has charged the battery pack by an improper charging method, etc.

The memory 13 included in the configuration of the battery pack 110 shown in FIG. 6 can also be replaced with the cloud 213.

(D)

In Embodiment 1 above, an example was given in which three of the battery packs 10 were installed in an electric motorcycle (vehicle 20) as a power consumption element. However, the present invention is not limited to this.

For example, one or two battery packs may be installed in the power consumption element, or four or more may be used.

Also, a plurality of battery pack mounting components may be provided on the power consumption element side, and a number of battery packs corresponding to the required electrical capacity may be installed.

Also, an example was given in which the three battery packs 10 installed in the vehicle 20 were configured such that they were disposed under the seat 20a. However, the present invention is not limited to this, and the battery packs may be installed in the vehicle somewhere other than under the seat.

(E)

In Embodiment 1 above, an example was given in which the battery pack 10 was equipped with the display component 16 for displaying the result of detecting whether or not charging was being done by an improper charging method. However, the present invention is not limited to this.

For example, the battery pack may not be provided with a display component.

Here again, when charging by an improper charging method is detected, the detection result can be transmitted via the communication component to the business owner of the battery pack.

Thus, the business owner who manages the battery packs can warn a user who has performing charging by an improper charging method, or can predict that the usable life will be shortened by deterioration, thereby making the service life of the battery pack more accurate.

(F)

In Embodiments 1 and 2 above, an example was given in which whether or not charging is done by an improper charging method can be determined by analysis of the current waveform or voltage waveform which measured during charging, or by frequency analysis in which the current waveform or voltage waveform is subjected to Fourier transformation. However, the present invention is not limited to this.

For example, whether or not charging is done by an improper charging method can be determined by combining frequency analysis with analysis of the current waveform or voltage waveform.

(G)

In Embodiment 1 above, an example was given in which the battery pack 10 pertaining to the present invention was used as a battery installed in the vehicle 20, such as an electric motorcycle. However, the present invention is not limited to this.

For example, in addition to an electric motorcycle, the present invention may also be applied to a battery pack for supplying power to some other vehicle, such as an electric unicycle, an electric bicycle, an electric automobile (EV), or a PHV (plug-in hybrid vehicle).

Alternatively, what the battery pack of the present invention is installed in is not limited to a vehicle, and may instead be some other electrical product driven by a replaceable battery.

INDUSTRIAL APPLICABILITY

The effect of the battery pack of the present invention is that charging by an improper charging method can be detected, so this invention can be widely applied to battery packs used in a variety of electrical products

REFERENCE SIGNS LIST 10 battery pack
11 input component
12 current and voltage measurement component
13 memory (storage component)
14 improper charge detector
15 communication component
16 display component
20 vehicle
20a seat
20b handle bar
21 front wheel
22 rear wheel (drive wheel)
50 improper charger
51 charging voltage application component
60 battery pack business owner
100 battery system
110 battery pack
120 designated charger
121 charging voltage application component
122 improper charge detector
123 communication component
210 battery pack
213 cloud
S step

The invention claimed is:

1. A battery system, comprising:
a battery pack that is charged by a charger, comprising:
an input component to which current and voltage are applied from the charger;
a current and voltage measurement component configured to measure the current and voltage inputted to the input component;
an improper charge detector configured to determine whether charging occurs via an improper charging method by comparing a measurement result from the current and voltage measurement component with a reference measurement result corresponding to charging applied by a designated charger;
a storage component configured to store the measurement result, comprising a current value or a voltage value measured by the current and voltage measurement component, and the reference measurement result corresponding to the charging applied by the designated charger; and
the designated charger, comprising an improper charge detector configured to:
receive the measurement result from the storage component of the battery pack;
compare the received measurement result and a second reference measurement result corresponding to charging applied with a specific designated charger; and
determine whether charging occurs via an improper charging method, based on the comparison, wherein
the improper charge detector performs waveform analysis or frequency analysis on the basis of the measurement result from the current and voltage measurement component.

2. The battery system according to claim 1, further comprising a communication component configured to communicate a detection result from the improper charge detector.

* * * * *